US010848651B2

(12) United States Patent
Tsai et al.

(10) Patent No.: US 10,848,651 B2
(45) Date of Patent: Nov. 24, 2020

(54) IMAGE CAPTURING DEVICE WITH CLIP MEMBER

(71) Applicant: Wistron NeWeb Corp., Hsinchu (TW)

(72) Inventors: Yung-Ping Tsai, Hsinchu (TW); Ting-Hsuan Chen, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 47 days.

(21) Appl. No.: 16/055,324

(22) Filed: Aug. 6, 2018

(65) Prior Publication Data

US 2019/0199892 A1 Jun. 27, 2019

(30) Foreign Application Priority Data

Dec. 22, 2017 (TW) .................................. 106145273

(51) Int. Cl.
*H04N 5/225* (2006.01)
*G03B 17/56* (2006.01)
*G03B 17/02* (2006.01)

(52) U.S. Cl.
CPC ........... *H04N 5/2252* (2013.01); *G03B 17/02* (2013.01); *G03B 17/566* (2013.01); *H04N 5/2253* (2013.01)

(58) Field of Classification Search
CPC .... H04N 5/2252; H04N 5/2253; G03B 17/02; G03B 17/566
See application file for complete search history.

(56) References Cited

U.S. PATENT DOCUMENTS

| 2006/0204242 | A1* | 9/2006 | Gutierrez | ................. G03B 3/10 |
| | | | | 396/439 |
| 2014/0078387 | A1* | 3/2014 | Tao | ....................... H04N 5/2252 |
| | | | | 348/374 |
| 2019/0028620 | A1 | 1/2019 | Park | |
| 2019/0174623 | A1* | 6/2019 | Owaki | ............... H04N 5/22521 |

FOREIGN PATENT DOCUMENTS

| CN | 203278998 U | * | 11/2013 |
| CN | 203278998 U | | 11/2013 |
| CN | 206585646 U | | 10/2017 |
| CN | 107395944 A | | 11/2017 |
| TW | 201612617 A | | 4/2016 |
| TW | 107395944 A | | 11/2017 |
| WO | 2017/122971 A1 | | 7/2017 |

* cited by examiner

*Primary Examiner* — Antoinette T Spinks
(74) *Attorney, Agent, or Firm* — McClure, Qualey & Rodack, LLP

(57) ABSTRACT

An image capturing device is provided. The image capturing device includes a housing, an image capturing module, a cover, and a clip member. The housing includes an open end. The image capturing module is disposed in the housing. The cover detachably covers the open end. The clip member clips the housing and the cover to prevent the cover from being separated from the housing.

12 Claims, 21 Drawing Sheets

IMAGE CAPTURING DEVICE WITH CLIP MEMBER

CROSS REFERENCE TO RELATED APPLICATIONS

This Application claims priority of Taiwan Patent Application No. 106145273, filed on Dec. 22, 2017, the entirety of which is incorporated by reference herein.

BACKGROUND OF THE INVENTION

Field of the Invention

The present invention relates to an image capturing device, and in particular to an image capturing device with decreased size.

Description of the Related Art

Image capturing devices are commonly utilized on mobile vehicles. The size of such image capturing devices has gradually miniaturized as technology advances, and yet the requirements on such image capturing devices are becoming stricter, for example, stricter requirement on the waterproof capability and resolution of images captured. Image capturing devices usually include a housing with a cover, and, conventionally, the housing is attached to the cover with screws or bolts. However, the downside of implementing these physical bolts and screws restrain miniaturization of the image capturing device, thereby limiting their smallest possible size. As a result, the application of them is limited and the cost of material and assembly are also increased.

BRIEF SUMMARY OF THE INVENTION

In one embodiment, an image capturing device is provided. The image capturing device includes a housing, an image capturing module, a cover, and a clip member. The housing includes an open end. The image capturing module is disposed in the housing. The cover is detachably covering the open end. The clip member clips the housing and the cover to prevent the cover from being separated from the housing.

In another embodiment of the invention, a method for assembling an image capturing device is provided, which includes the following steps. First, a housing is provided, wherein the housing defines a receiving space and has an open end exposing the receiving space, the receiving space comprises at least one positioner, a tube is formed on a side of the housing away from the open end, a tube path is formed inside the tube, and the tube path is communicated with the receiving space. Then, a first substrate is placed into the receiving space via the open end, wherein the positioner positions the first substrate, an optical sensor is formed on one side of the first substrate facing the tube path, the first substrate entirely covers the tube path, and the optical sensor covers at least a portion of the tube path. Next, a spacer is placed into the receiving space via the open end, wherein the spacer directly abuts the other side of the first substrate. Then, a second substrate is placed into the receiving space via the open end, wherein the second substrate directly abuts the spacer. Next, the open end of the housing is entirely covered with a cover, wherein at least one elastic abutting member and an elastic seal are formed on one side of the cover facing the receiving space, the elastic abutting member presses against the second substrate, and the elastic seal seals the open end of the housing. Then, a clip member is provided, wherein the clip member comprises a base and two levers connected to the base, the two levers face each other, each lever comprises at least one extending section connected to the base, each extending portion has a second bending portion, the second bending portions of the extending portions are bent in opposite directions, and the base has a hole. Next, the tube of the housing is inserted into the hole of the clip member. Then, the second bending portions are bent, wherein the second bending portions are close to each other to clip the housing and the cover, the housing comprises a housing abutting surface, the cover comprises a cover abutting surface, the housing abutting surface is opposite to the cover abutting surface, and the clip member abuts the housing abutting surface and the cover abutting surface simultaneously.

Utilizing the image capturing device of the embodiment of the invention, the housing is attached to the cover using the clip member. The space occupied by the conventional bolt holes and bolts are omitted, and the size of the image capturing device is decreased. Additionally, the process of assembling the image capturing device of the embodiment of the invention is simple, and automated assembly can be utilized to reduce the cost of assembly.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
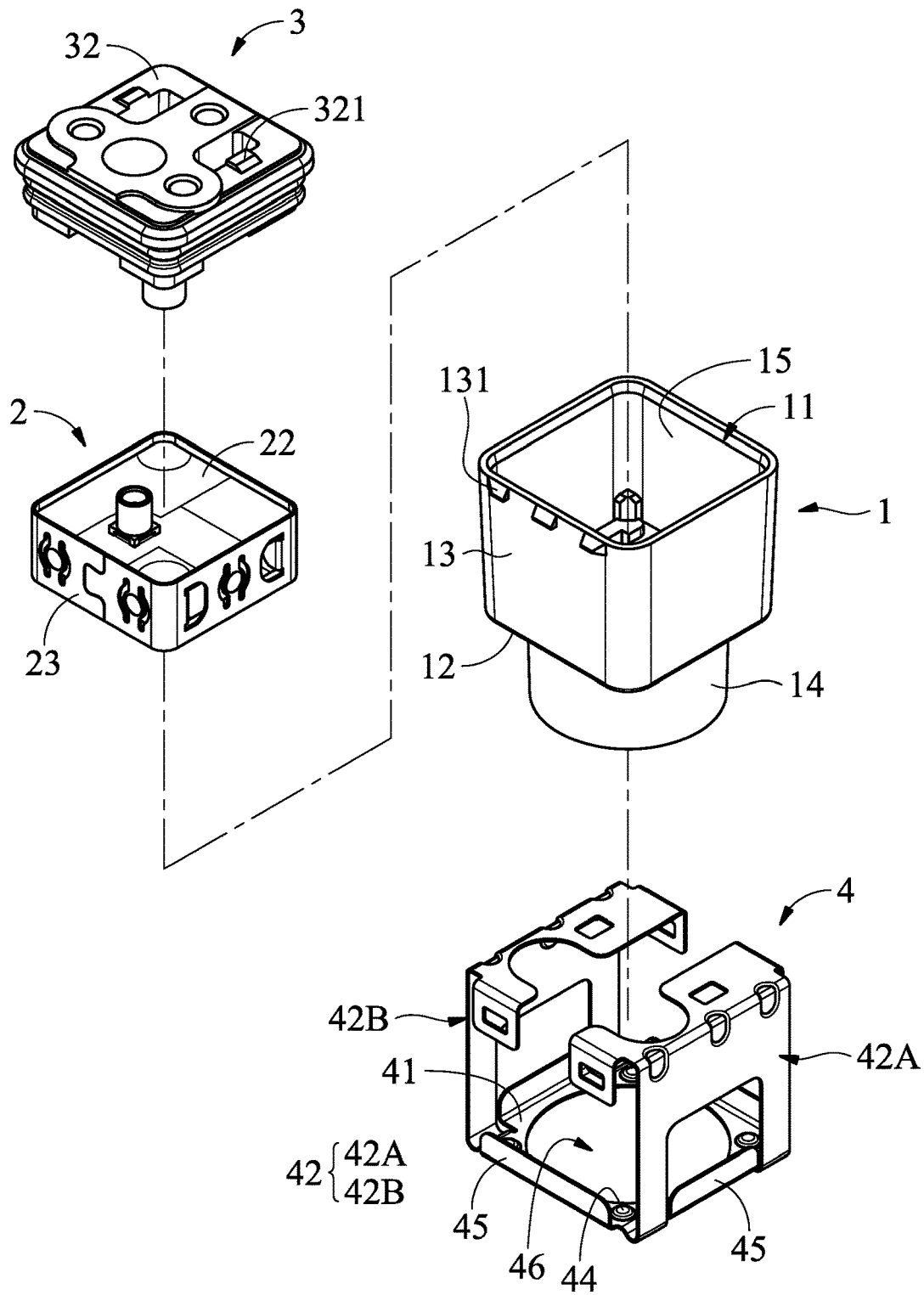
FIG. 1A is an exploded view of an image capturing device of an embodiment of the invention.
Figure 1B:
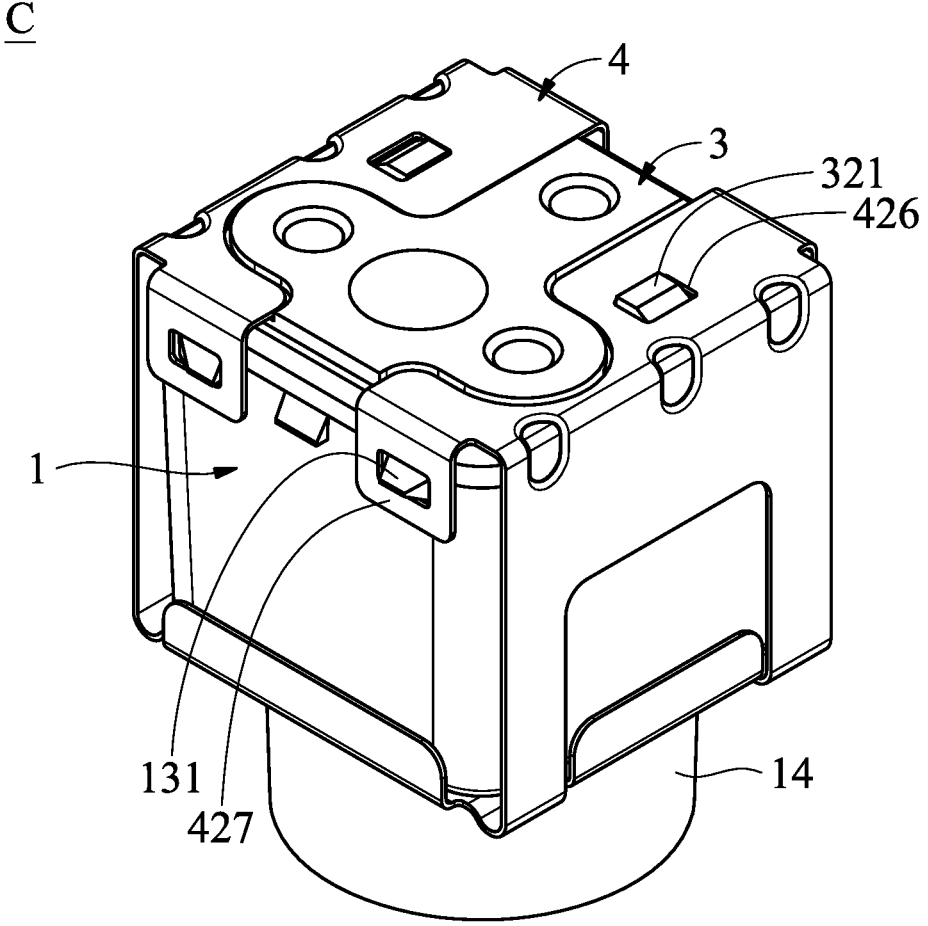
FIG. 1B is an assembled view of the image capturing device of the embodiment of the invention.

FIG. 1A is an exploded view of an image capturing device C of an embodiment of the invention. FIG. 1B is an assembled view of the image capturing device C of the embodiment of the invention. With reference to FIGS. 1A and 1B, the image capturing device C includes a housing 1, an image capturing module 2, a cover 3 and a clip member 4. The housing 1 includes an open end 11. The image capturing module 2 is disposed in the housing 1. The cover 3 detachably covers the open end 11. The clip member 4 clips the housing 1 and the cover 3 to prevent the cover 3 from being separated from the housing 1.

With reference to FIGS. 1A and 1B, in one embodiment, the housing 1 comprises a housing abutting surface 12. The cover 3 comprises a cover abutting surface 32. The housing abutting surface 12 is opposite to the cover abutting surface 32. The clip member 4 abuts the housing abutting surface 12 and the cover abutting surface 32 simultaneously.

Figure 2:
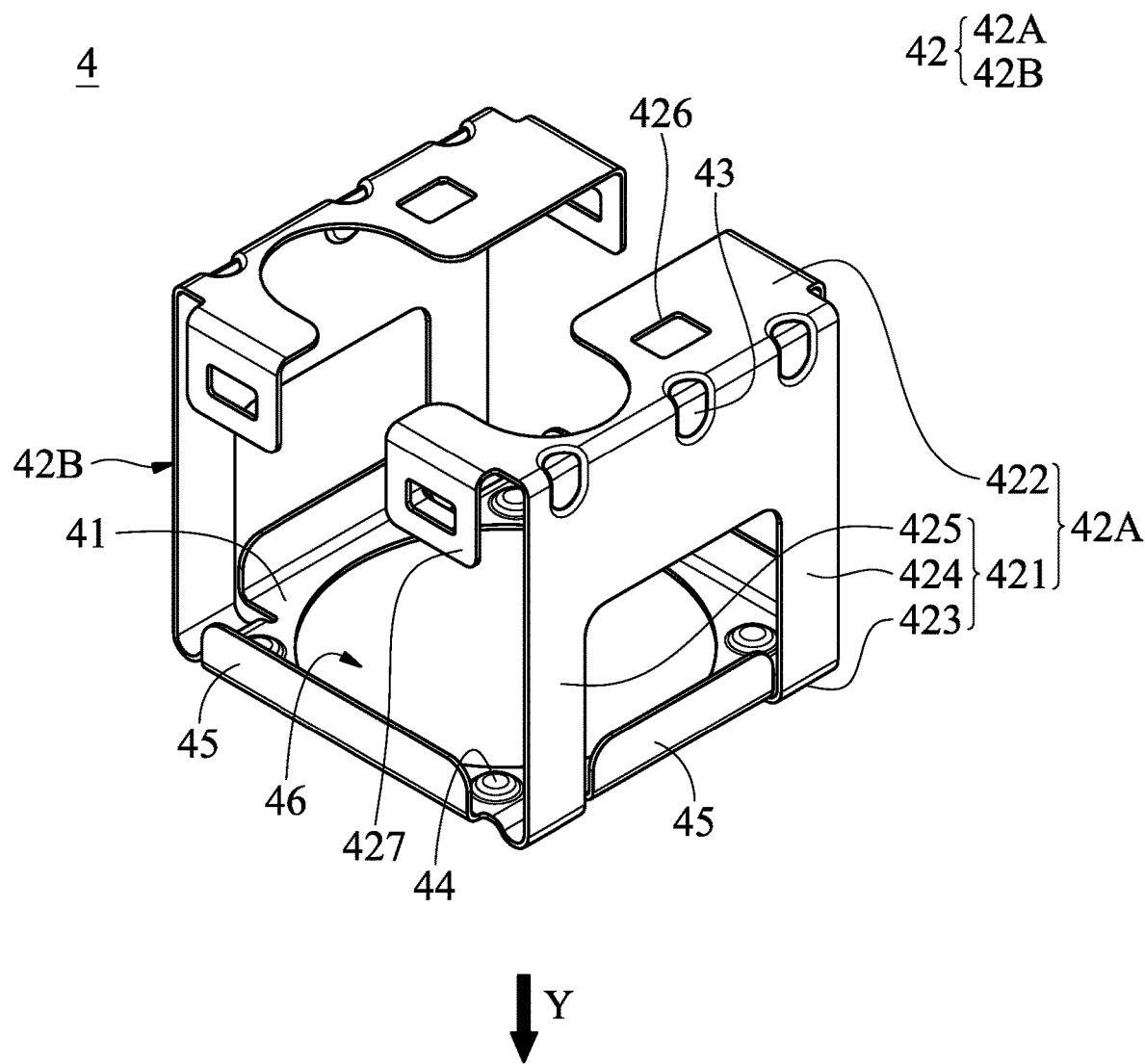
FIG. 2 shows the details of the clip member of the first embodiment of the invention.

FIG. 2 shows the details of the clip member 4. With reference to FIGS. 1A, 1B and 2, in one embodiment, the clip member 4 comprises a base 41 and a plurality of levers 42. In this embodiment, the levers 42 comprise a first lever 42A and a second lever 42B, and both being upright and parallel. The base 41 abuts the housing abutting surface 12. The levers 42 are disposed on opposite lateral sides of the base 41. The levers 42 abut the cover abutting surface 32.

In one embodiment, each lever 42 comprises at least one extending section 421 and at least one snap-in section 422. The extending section 421 connects to the base 41 and the snap-in section 422. The snap-in section 422 abuts the cover abutting surface 32.

In one embodiment, the extending section 421 comprises at least one first bending portion 423 connected to the base 41. The first bending portion 423 is an elastic portion. In one embodiment, the first bending portion 423 is a curved portion. The first bending portion 423 protrudes in a protruding direction Y from a base plane where the base 41 is lying on, and the protruding direction Y points away from the snap-in section 422.

In one embodiment, the extending section 421 comprises a first extending arm 424 and a second extending arm 425 separated from the first extending arm 424. The first extending arm 424 is parallel to the second extending arm 425, and the first extending arm 424 and the second extending arm 425 are connected to the first bending portions 423 respectively. By carving out the portion between the first extending arm 424 and the second extending arm 425, the extending section 421 can be more flexible.

With reference to FIGS. 1B and 2, in one embodiment, the snap-in section 422 comprises a first snap-in portion 426, the cover 3 comprises at least one cover protruding edge 321, the cover protruding edge 321 is formed on the cover abutting surface 32, and the first snap-in portion 426 and the cover protruding edge 321 together form a snap-fit joint. In one embodiment, the snap-in section 422 comprises a second snap-in portion 427, the housing 1 comprises at least one housing protrusion edge 131, the housing protrusion edge 131 is formed on a housing lateral surface 13 of the housing 1, and the second snap-in portion 427 and the housing protrusion edge 131 together form a snap-fit joint. In this embodiment, the second snap-in portion 427 and the extending section 421 are located on different planes.

With reference to FIG. 2, in one embodiment, the lever 42 further comprises at least one first rib 43. The first rib 43 is formed where the extending section 421 is connected to the snap-in section 422. The first rib 43 increases the strength of the lever 42, and prevents the unexpected deformation of where the extending section 421 joins the snap-in section 422.

In one embodiment, the clip member 4 further comprises a plurality of protrusions 44, and the protrusions 44 abut the housing abutting surface 12. The clip member 4 is sufficiently attached to the housing 1 via the protrusions 44. In one embodiment, the clip member 4 further comprises a plurality of second ribs 45, and the second ribs 45 are formed on the lateral sides of the base 41 to prevent the base 41 from being deformed.

With reference to FIGS. 1A, 1B and 2, in one embodiment, the base 41 comprises a hole 46. The housing 1 comprises a tube 14, and the housing 1 is assembled with the member 4 by disposing the tube 14 through the hole 46.

Figure 3A:
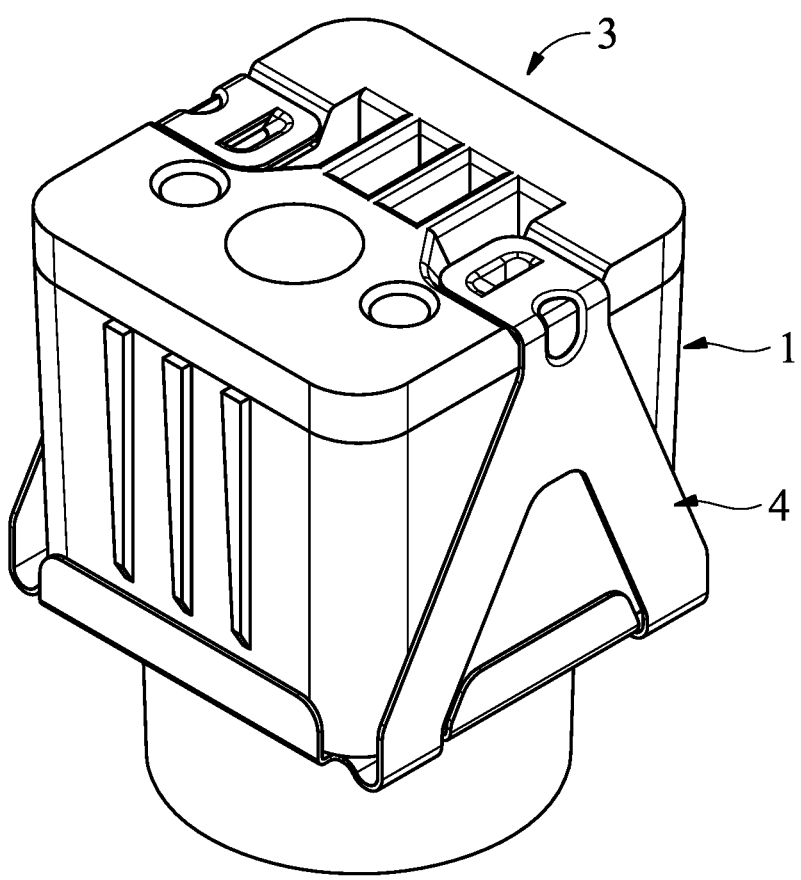
FIG. 3A shows a clip member of a second embodiment of the invention.
Figure 3B:
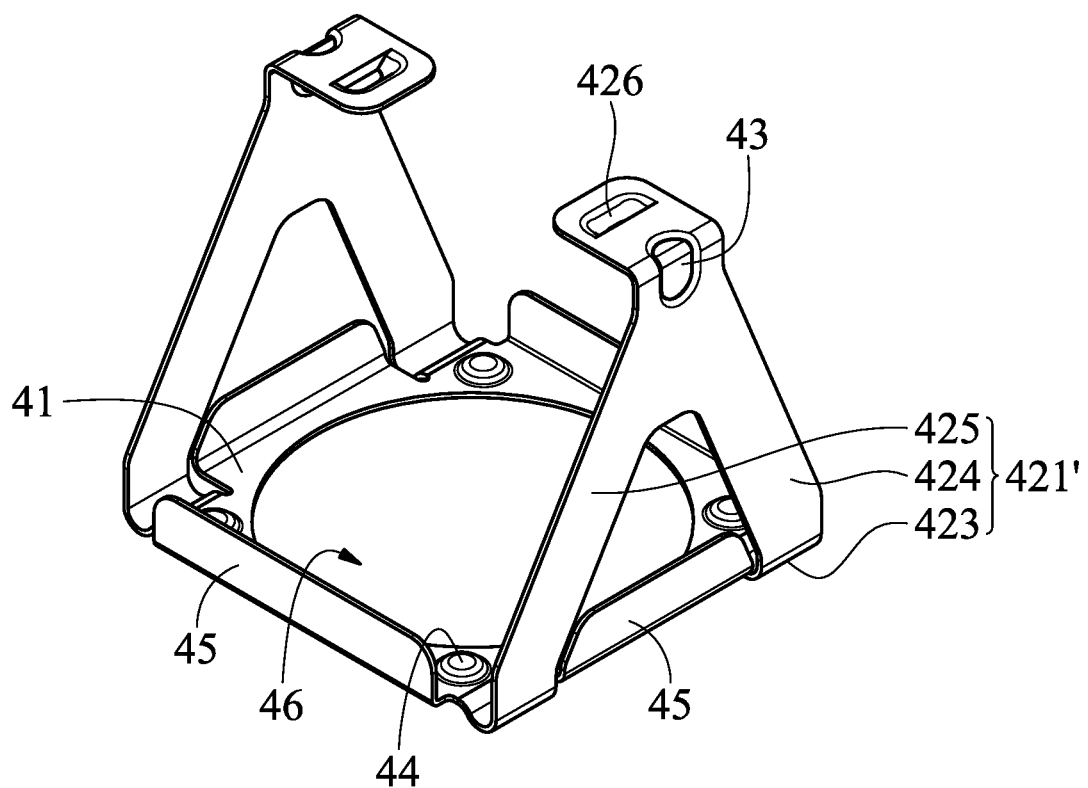
FIG. 3B is an assembled view of the image capturing device of the second embodiment of the invention.

FIG. 3A shows a clip member of a second embodiment of the invention. FIG. 3B is an assembled view of the image capturing device C of the second embodiment of the invention. With reference to FIGS. 3A and 3B, in one embodiment, the extending section 421' is a Y-shaped member. The extending section 421' comprises a first extending arm 424 and a second extending arm 425. One end of the first extending arm 424 joins one end of the second extending arm 425. The first extending arm 424 and the second extending arm 425 are connected to the first bending portions 423.

In the embodiments above, the lever comprises the first lever and the second lever. However, the disclosure is not meant to restrict the invention. For example, in one embodiment, the extending section may have one single extending arm. The shape of the extending section can also be modified. One extending section can corresponding to one single housing lateral side or to a plurality of housing lateral sides.

Figure 4:
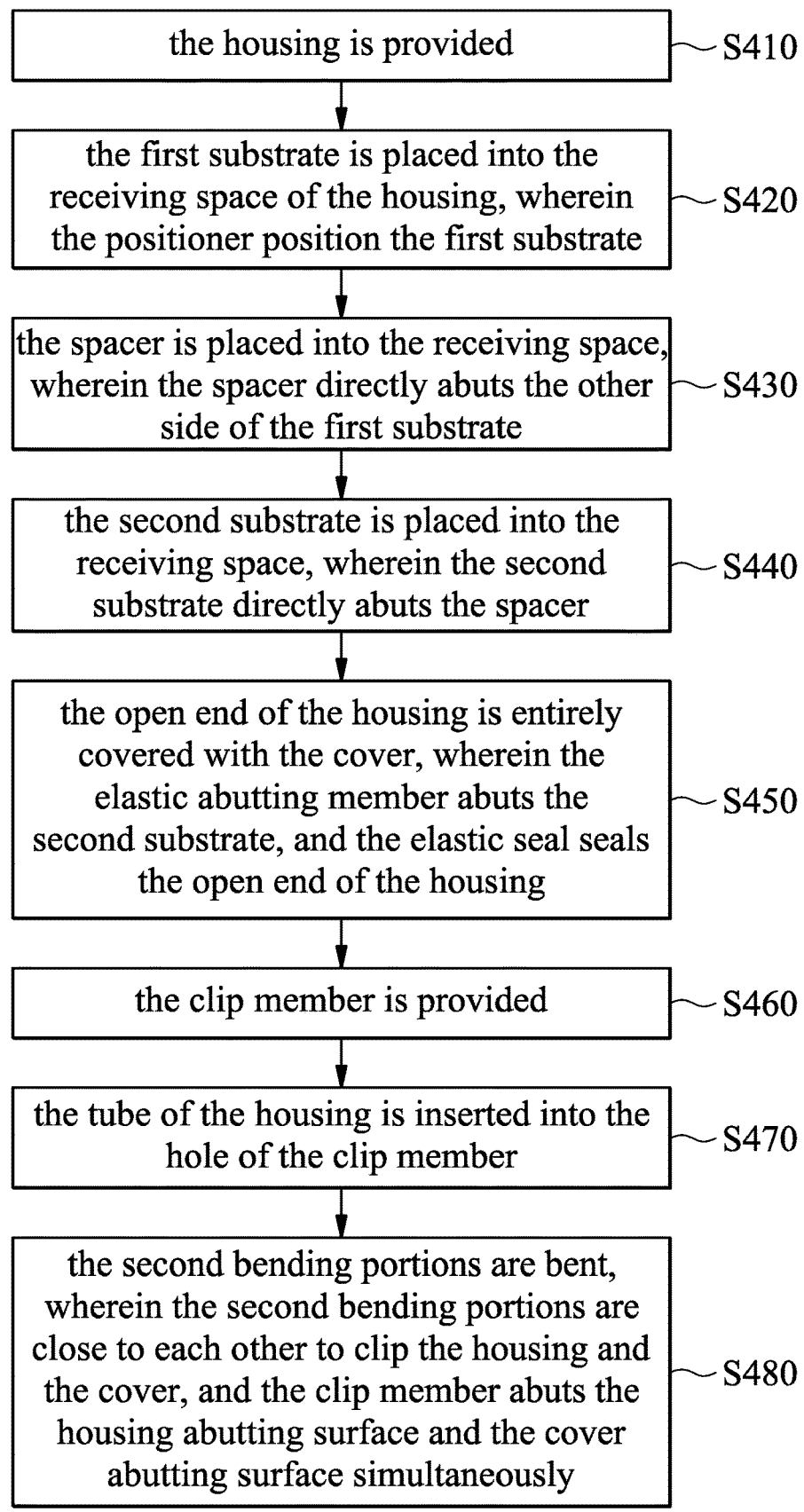
FIG. 4 shows a method for assembling the image capturing device of the embodiment of the invention.
Figure 5A:
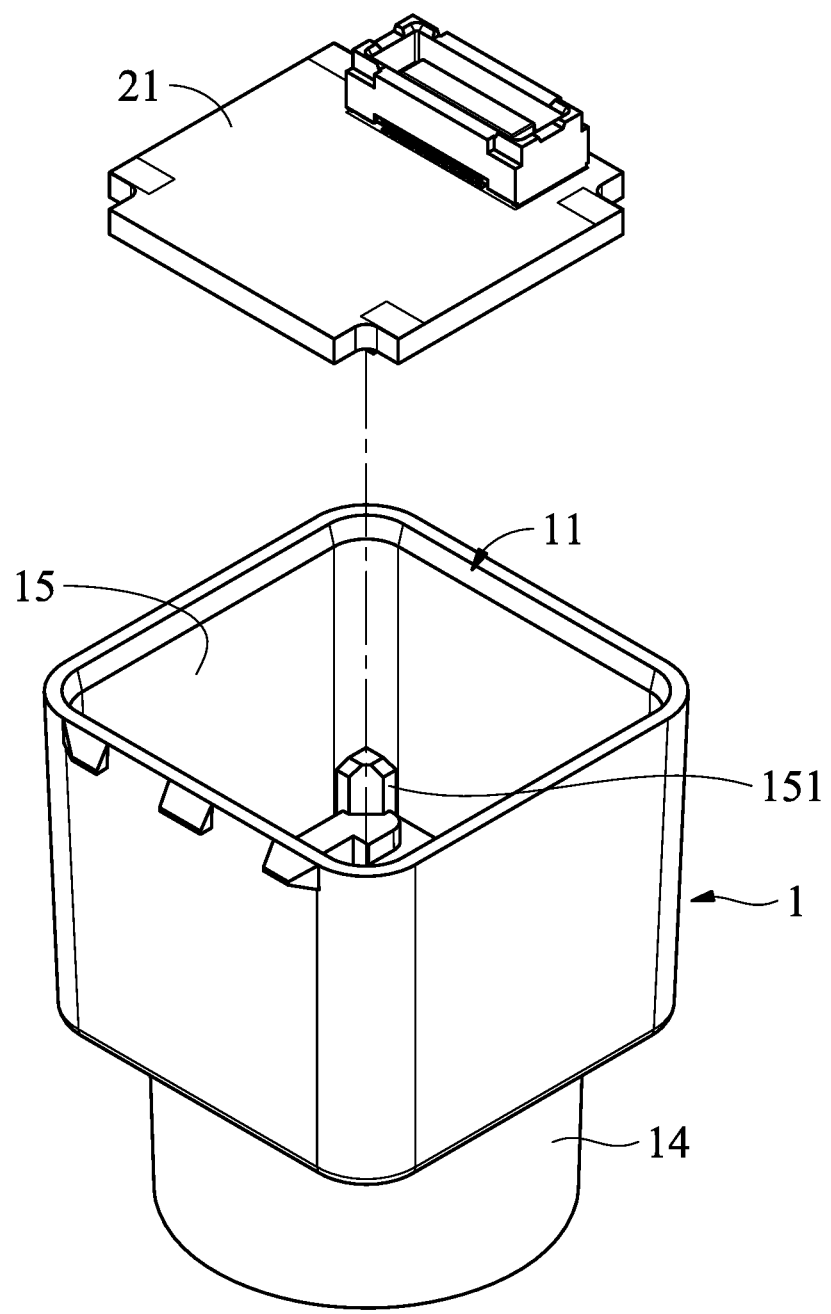
FIGS. 5A, 5B, 5C and 5D show the first substrate being placed into the receiving space.
Figure 5B:
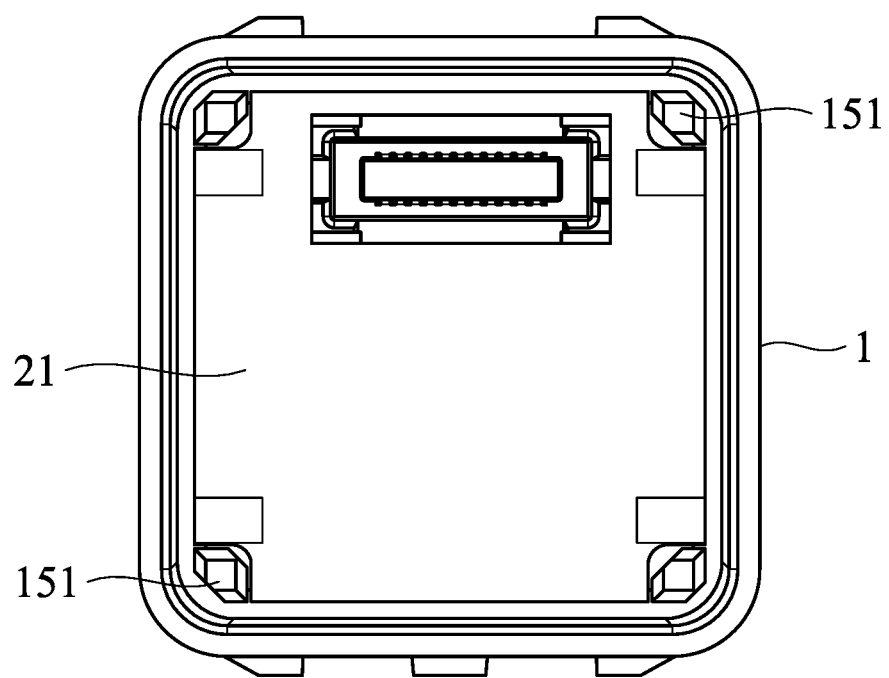
Figure 5C:
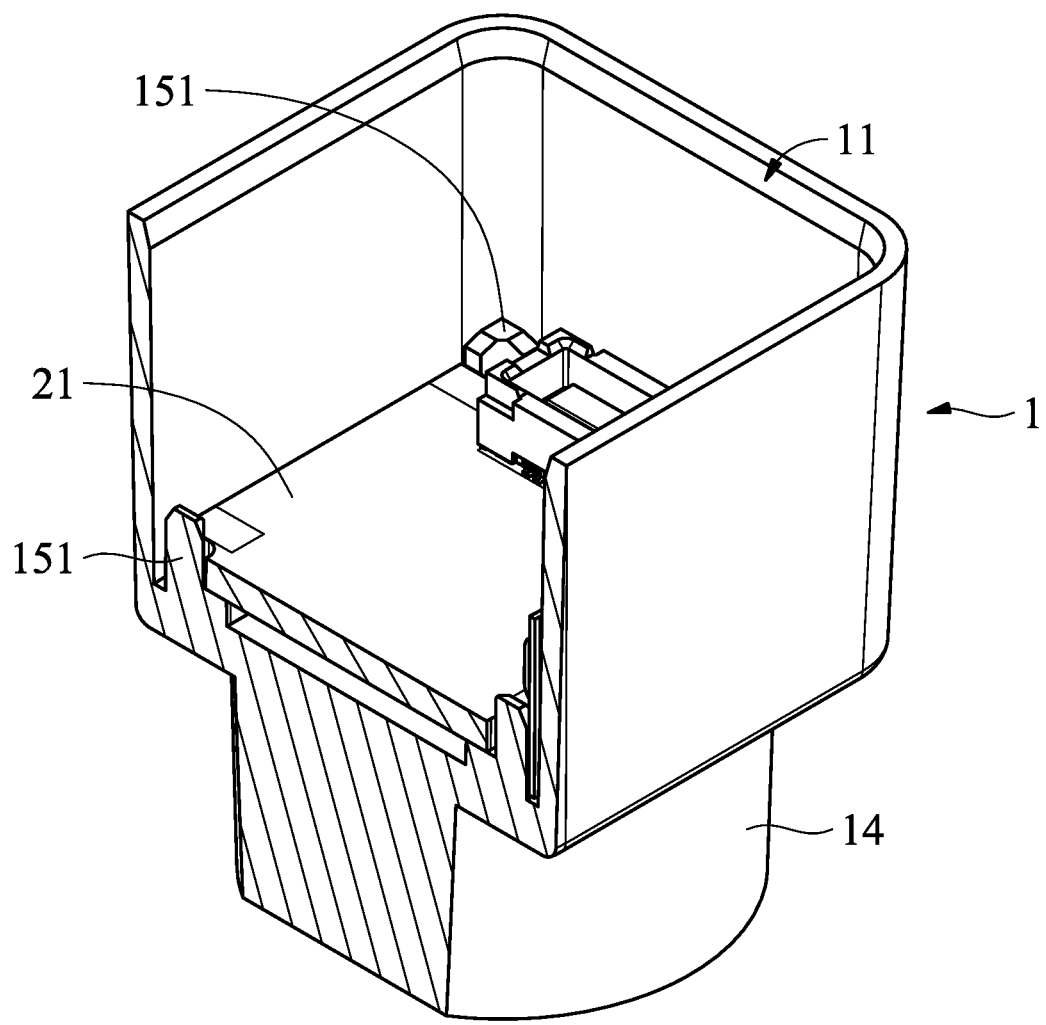
Figure 5D:
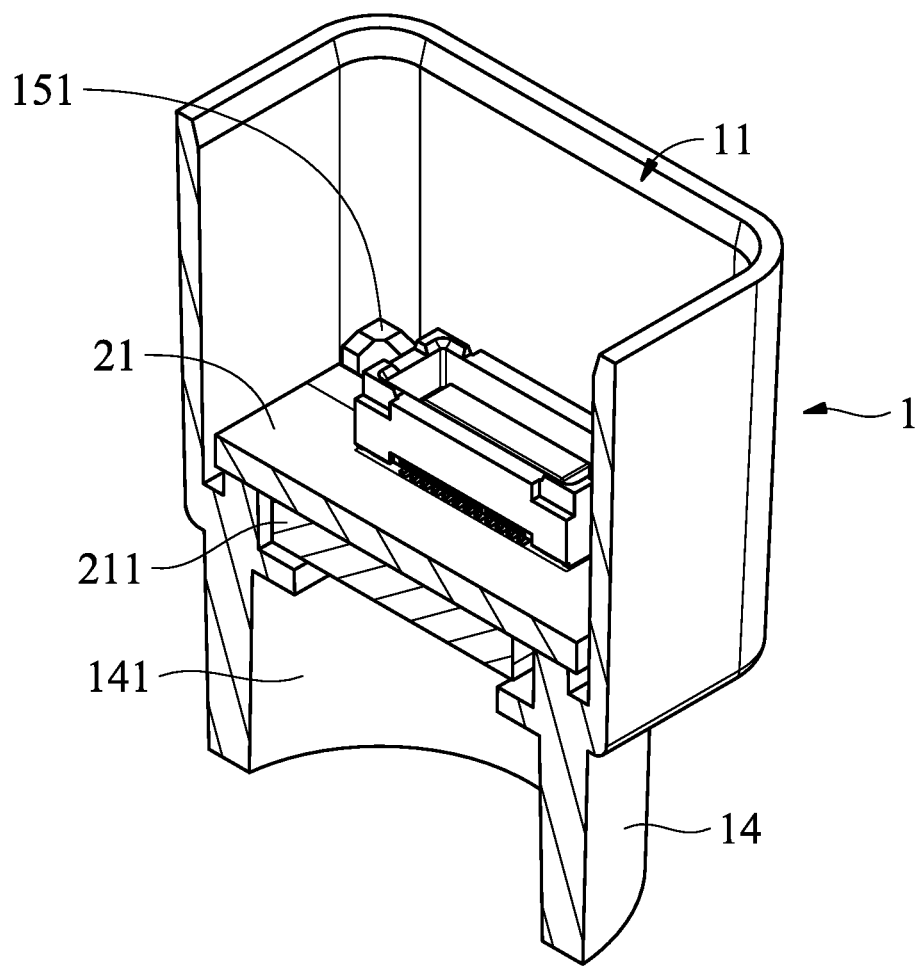

FIG. 4 shows a method for assembling the image capturing device of the embodiment of the invention. The method can be utilized in an automated manufacturing process. The method comprises the following steps. With reference to FIGS. 4, 5A, 5B, 5C and 5D. First, the housing 1 is provided (step S410), wherein the housing 1 defines a receiving space 15 and has an open end 11 exposing the receiving space 15, in which at least one positioner 151 is formed in the receiving space 15. A tube 14 is formed on a side of the housing 1 away from the open end 11. A tube path 141 is formed inside the tube 14. The tube path 141 is communicated with the receiving space 15. Then, the first substrate 21 is placed into the receiving space 15 via the open end 11 (step S420), wherein the positioner 151 position the first substrate 21, an optical sensor 211 is formed on one side of the first substrate 21 facing the tube path 141, the first substrate 21 entirely covers the tube path 141, and the orthogonal projection of the optical sensor 211 locates within a cross-section of the tube path 141.

Figure 6A:
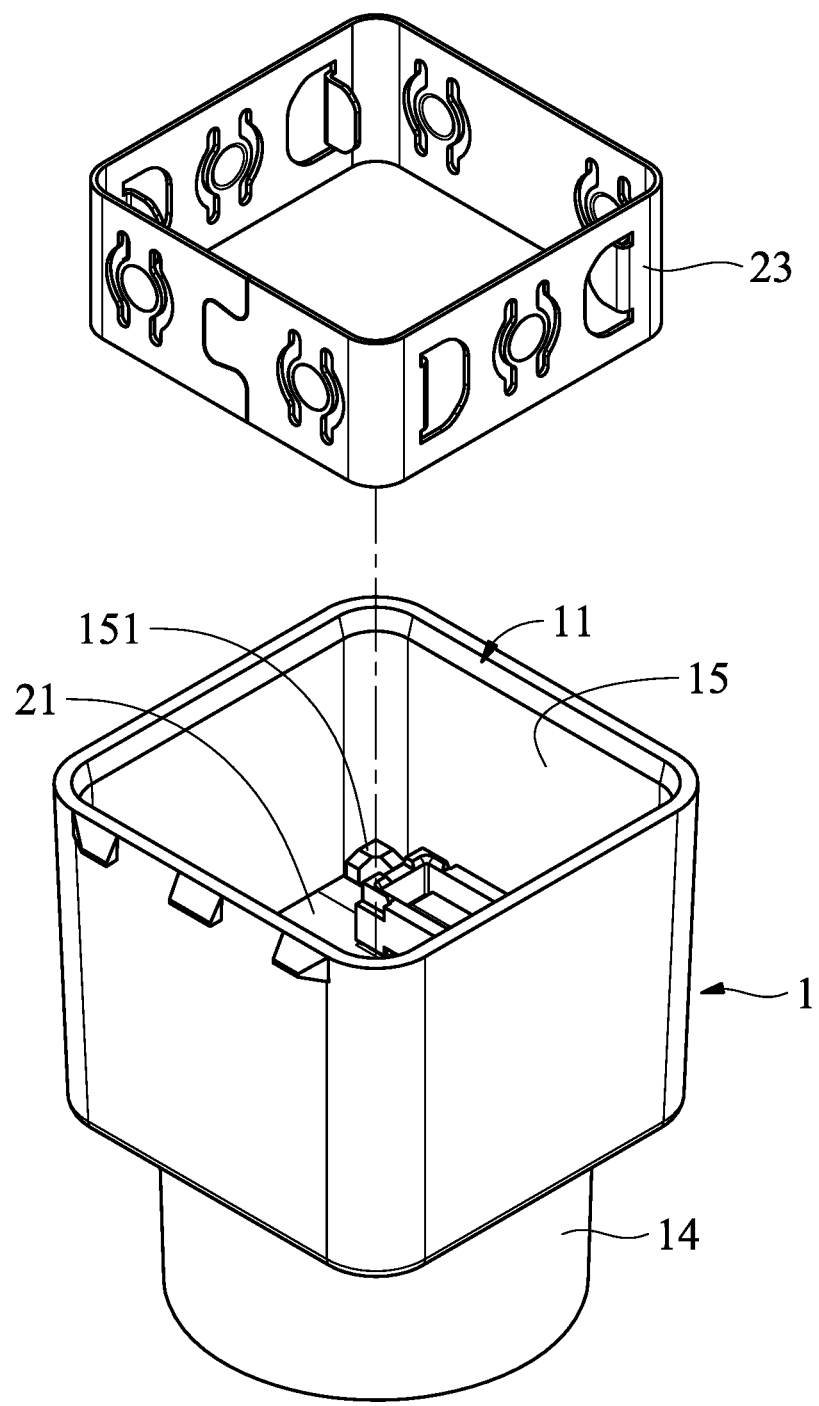
FIGS. 6A and 6B show the spacer being placed into the receiving space.
Figure 6B:
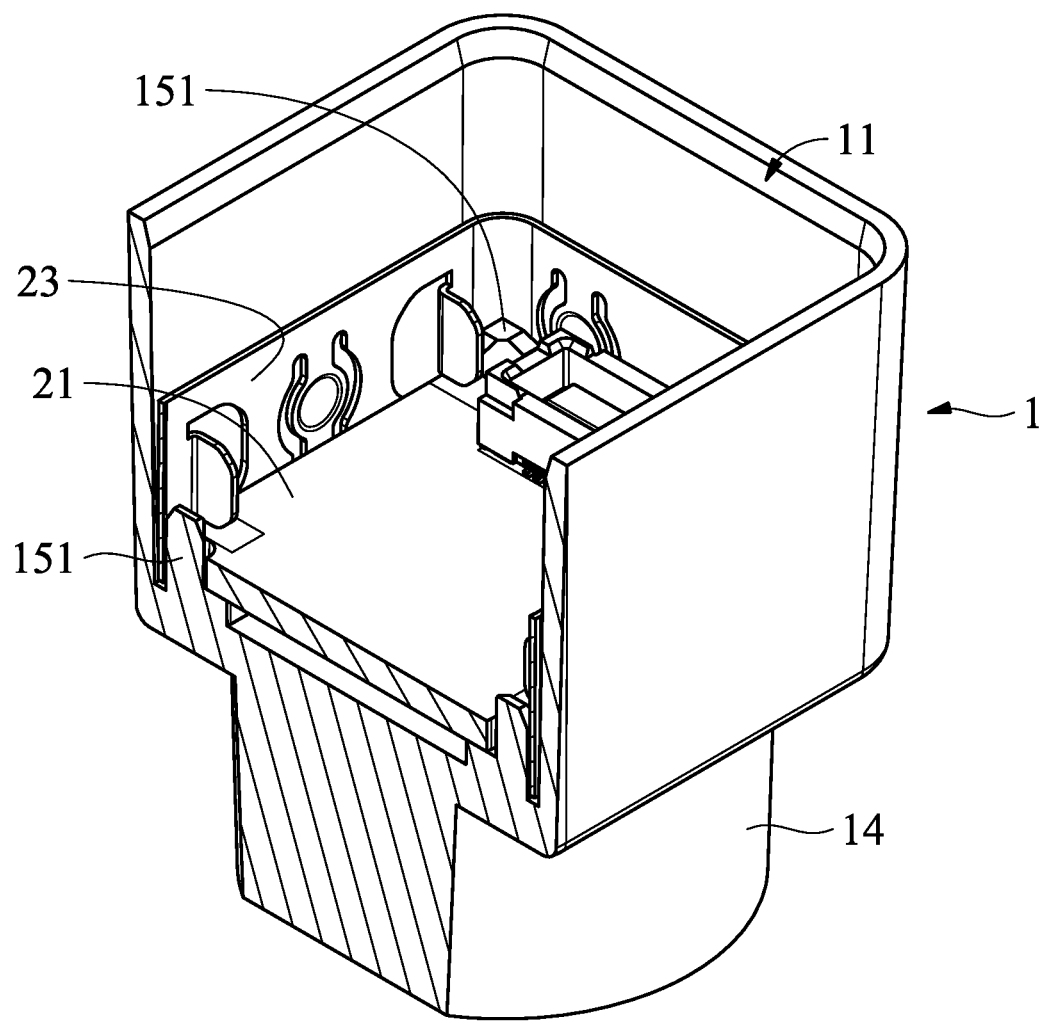

With reference to FIGS. 4, 6A and 6B, then, the spacer 23 is placed into the receiving space 15 via the open end 11 (step S430), wherein the spacer 23 abuts the other side of the first substrate 21.

Figure 7A:
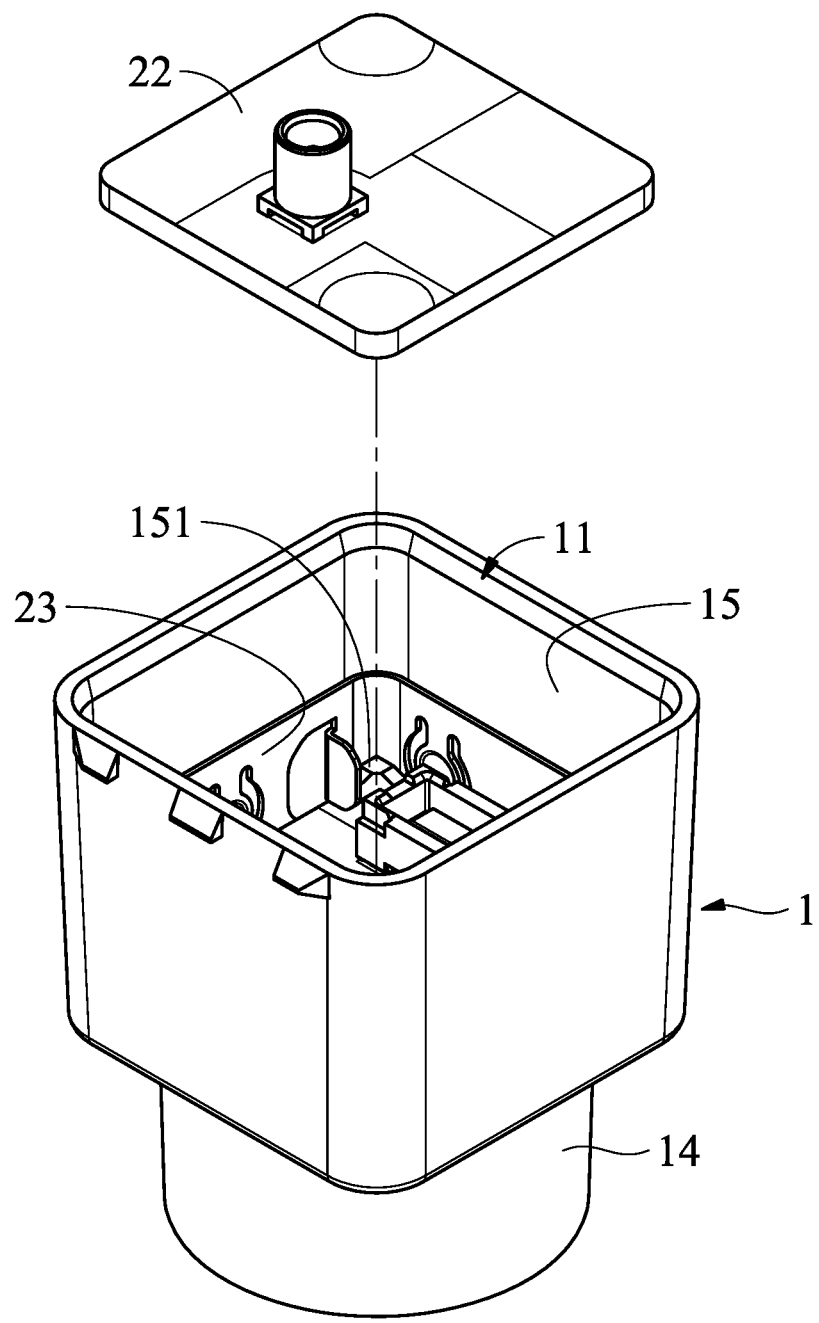
FIGS. 7A and 7B show the second substrate being placed into the receiving space.
Figure 7B:
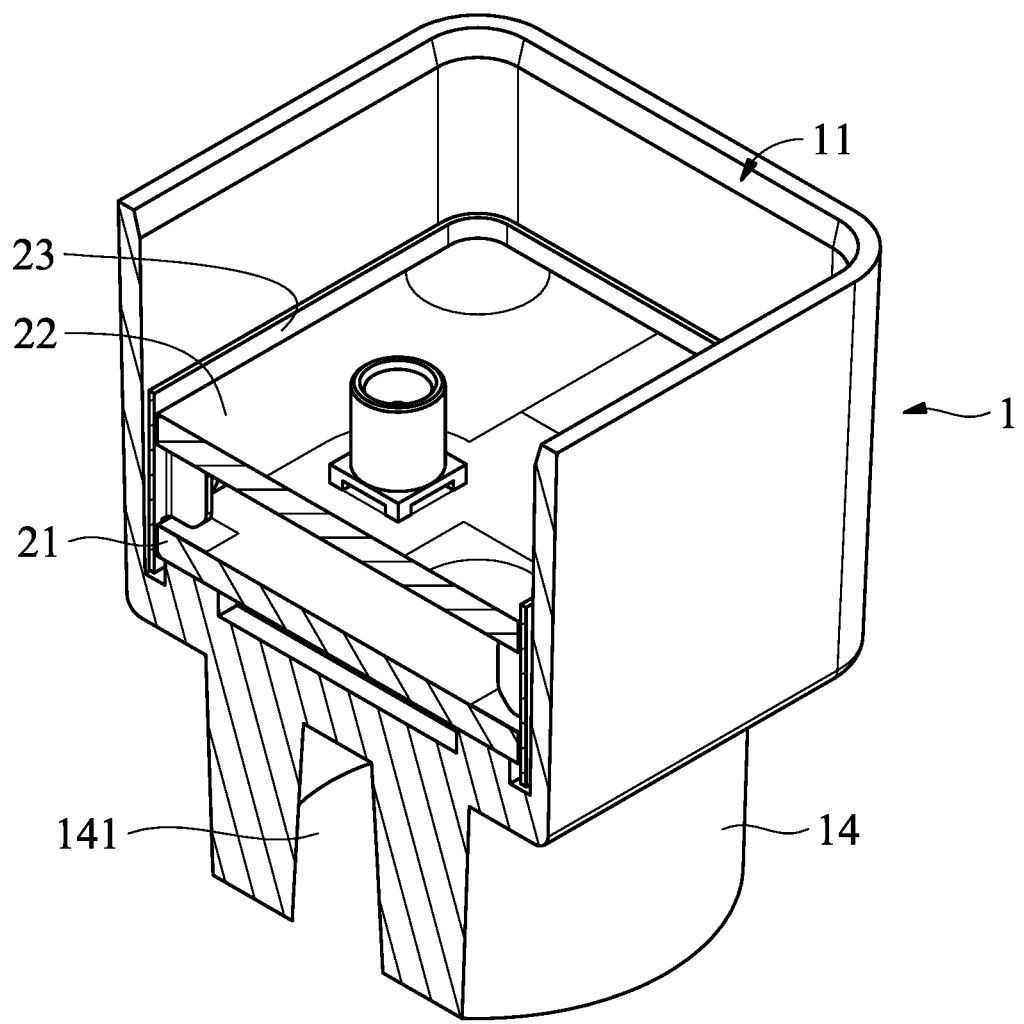

With reference to FIGS. 4, 7A and 7B, next, the second substrate 22 is placed into the receiving space 15 via the open end 1 (step S440), wherein the second substrate 22 abuts the spacer 23.

With reference to FIGS. 4, 8A, 8B and 8C, then, the open end 11 of the housing 1 is entirely covered with the cover 3 (step S450), wherein at least one elastic abutting member 33 and an elastic seal 34 are formed on one side of the cover 3 facing the receiving space 15, the elastic abutting member 33 presses against the second substrate 22, and the elastic seal 34 seals the open end 11 of the housing 1. As a result, the image capturing module 2, i.e. the first substrate 21 stacked with the second substrate 22 and the spacer 23, is sandwiched between the positioner 151 and the elastic abutting member 33.

Figure 9A:
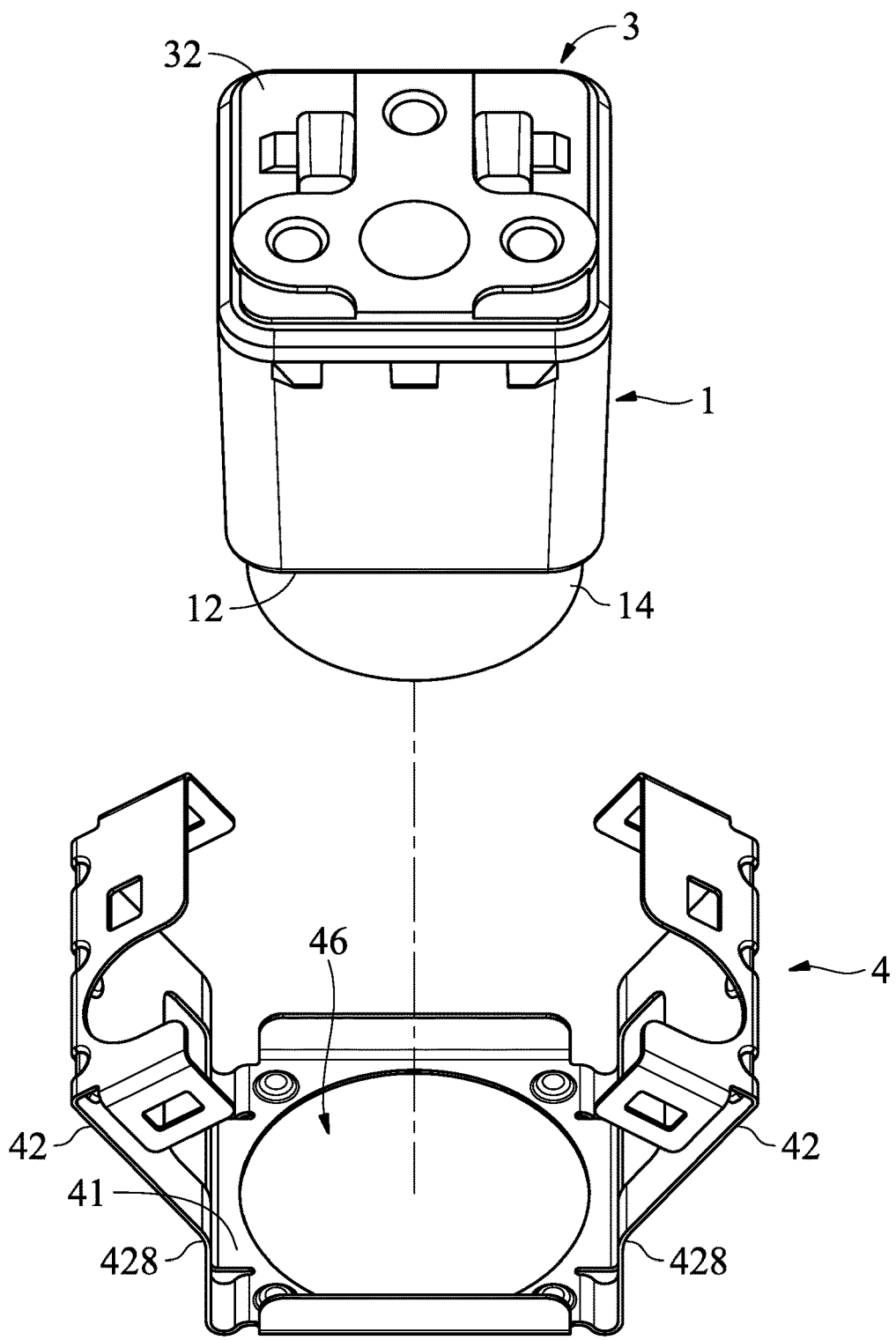
FIGS. 9A, 9B and 9C shows the clip member holding the housing and the cover.
Figure 9B:
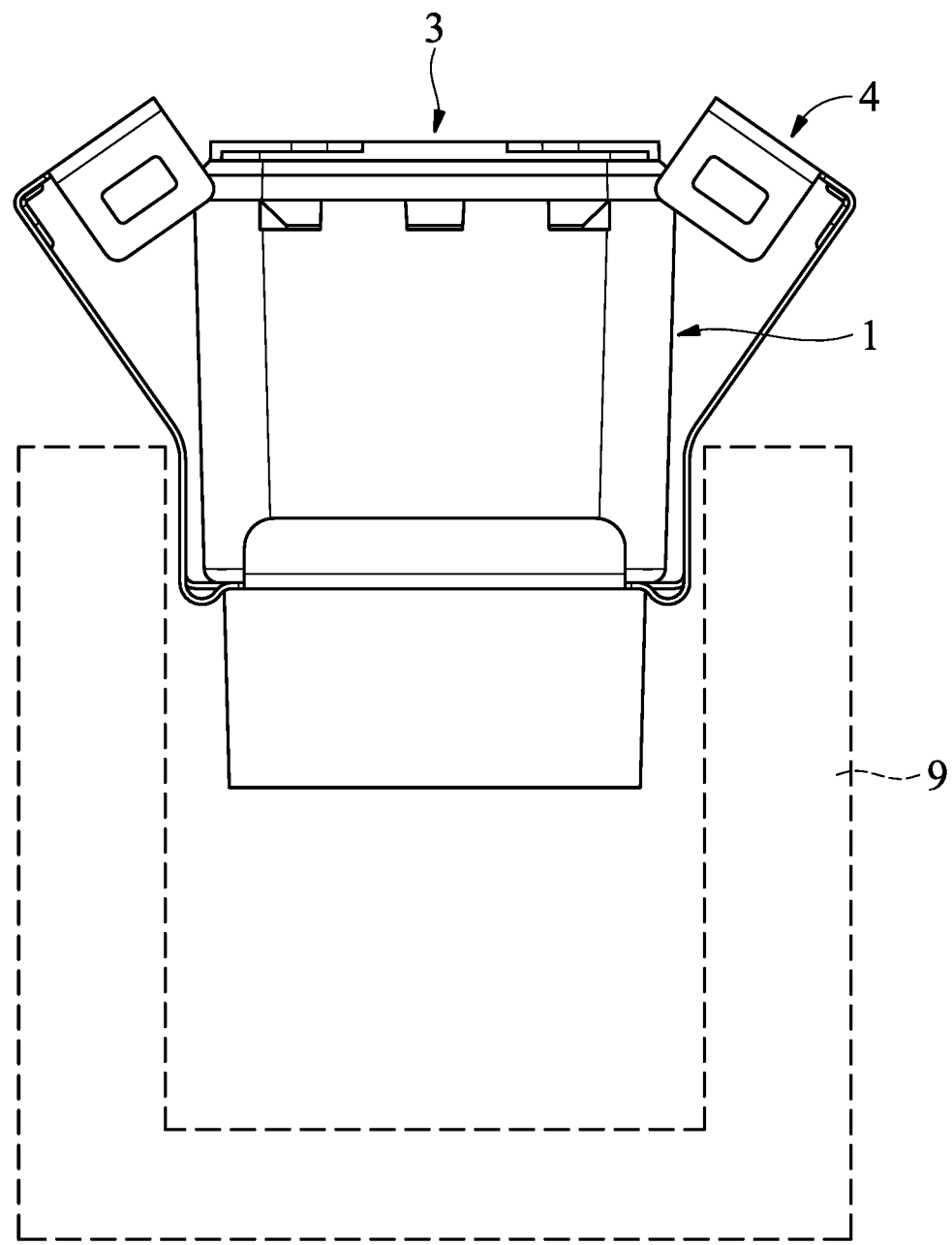

With reference to FIGS. 4, 9A and 9B, next, the clip member 4 is provided (step S460), wherein the clip member 4 comprises the base 41 and two levers 42 connected to the base 41, the two levers 42 face each other, each lever 42 comprises at least one extending section 421 connected to the base, each extending portion 421 has a second bending portion 428, the second bending portions 428 of the extending portions 421 are bent in opposite directions, and the base 41 has a hole 46. In one embodiment, the distance between each second bending portion 428 and the corresponding first bending portion 423 in the protruding direction Y is 30%~70% of the length of each of the extending arms 424 and 425 along the protruding direction Y (i.e. the perpendicular direction of the base 41).

Next, the tube 14 of the housing is inserted into the hole 46 of the clip member 4 (step S470). Then, the second bending portions 428 are bent (step S480) to be close to each other for clipping the housing 1 and the cover 3, the housing 1 comprises a housing abutting surface 12, the cover 3 comprises a cover abutting surface 32, the housing abutting surface 12 is opposite to the cover abutting surface 32, and the clip member 4 abuts the housing abutting surface 12 and the cover abutting surface 32.

Figure 9C:
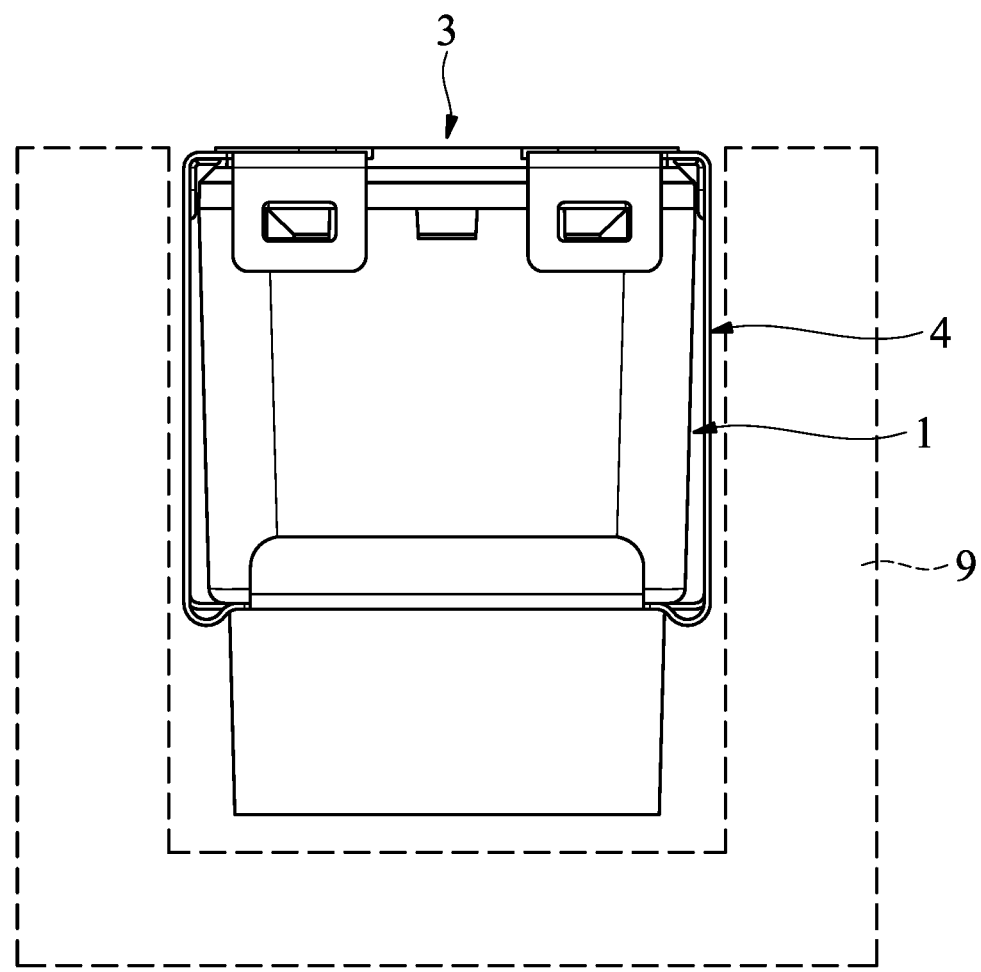

With reference to FIGS. 9B and 9C, in the embodiments above the second bending portions 428 are bent toward each other by a mold 9.

Figure 8A:
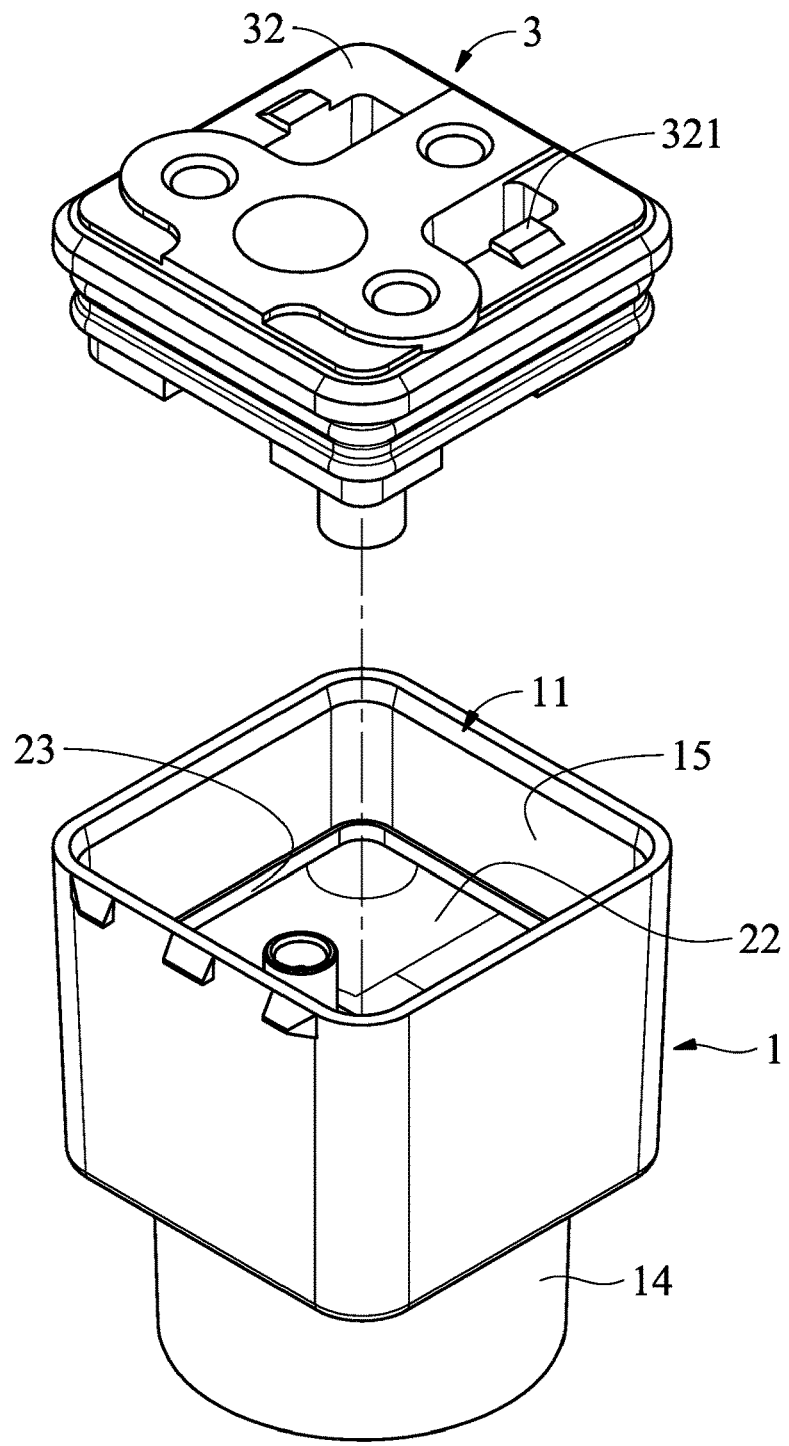
FIGS. 8A, 8B and 8C show the open end of the housing entirely covered with the cover.
Figure 8B:
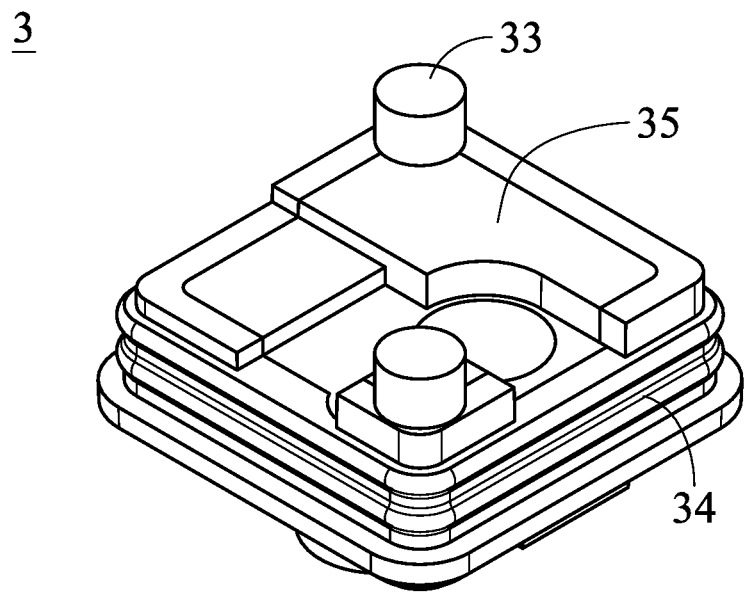
Figure 8C:
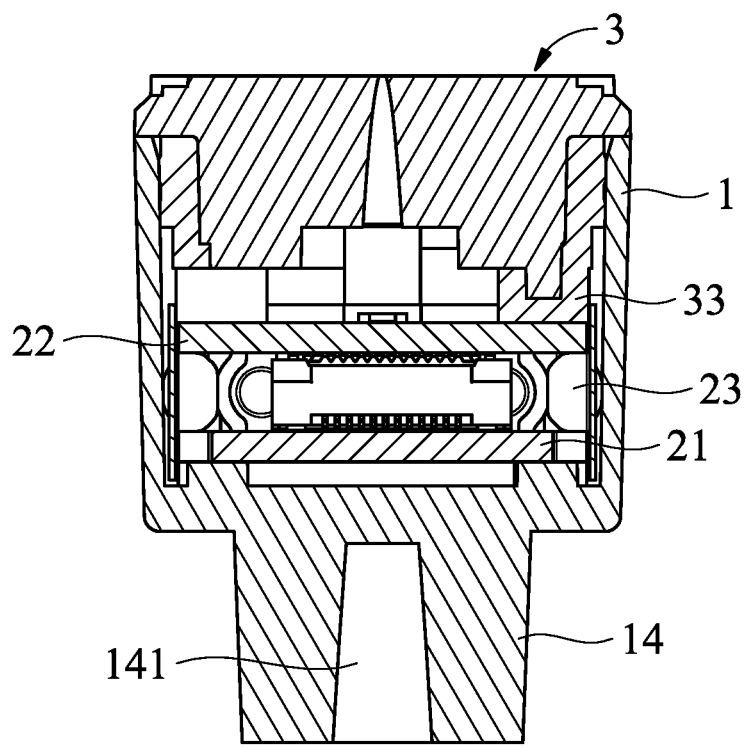

With reference to FIG. 8B, in one embodiment, the cover 3 comprises a cover body 35, an elastic seal 34, and a plurality of elastic abutting members 33. The elastic seal 34 is disposed on the cover body 35, the elastic abutting member 33 is disposed on the cover body 35, and the elastic abutting member 33 presses against the second substrate 22.

Figure 10:
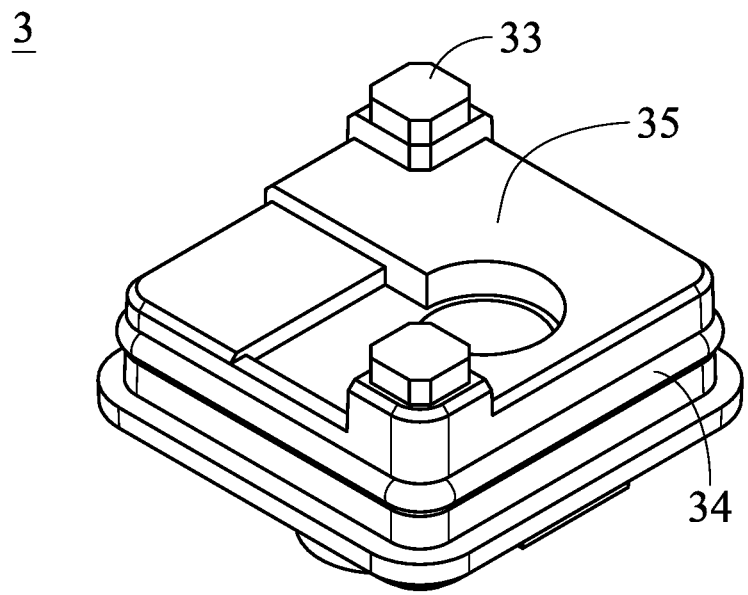
FIG. 10 shows the elastic abutting member of another embodiment of the invention.

In the embodiment of FIG. 8B, the elastic seal 34 and the elastic abutting member 33 can be integrally formed. However, the disclosure is not meant to restrict the invention. With reference to FIG. 10, in another embodiment, the elastic abutting member 33 can be attached on the cover body 35.

Utilizing the image capturing device of the embodiment of the invention, the housing and the cover are simply assembled to each other by applying the clip member. The space occupied by the conventional bolt holes and bolts are omitted, and thus the image capturing device is miniaturized. Additionally, the assembly process of the image capturing device of the embodiment of the invention can be performed by automated assembling and thereby reducing the overall cost, enhance the assembling efficiency and expanding the capacity of image capturing devices.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capturing device, comprising:
   a housing, comprising a receiving space and an open end, wherein the housing has a tube extending outward on one side away from the open end, a tube path is formed inside the tube, and the tube path is communicated with the receiving space;
   an image capturing module, adapted to be disposed into the receiving space via the open end, wherein the image capturing module has a first substrate, an optical sensor is formed on one side of the first substrate facing the tube path, and the optical sensor covers at least a portion of the tube path;
   a cover, detachably covering the open end; and
   a clip member, clipping the housing and the cover to prevent the cover from being separated from the housing, wherein the housing comprises a housing abutting surface, the cover comprises a cover abutting surface, the housing abutting surface is opposite to the open end and also opposite to the cover abutting surface, and the clip member abuts the housing abutting surface and the cover abutting surface simultaneously,
   wherein the clip member comprises a base and two levers, the base abuts the housing abutting surface, the levers are respectively connected to two opposite lateral sides of the base, and the levers abut the cover abutting surface,
   wherein each lever comprises at least one extending section and at least one snap-in section, the extending section connects the base to the snap-in section, and the snap-in section abuts the cover abutting surface,
   wherein the snap-in section comprises a first snap-in portion, the cover comprises at least one cover protruding edge, the cover protruding edge is formed on the cover abutting surface, and the first snap-in portion and the cover protruding edge together form a snap-fit joint,
   wherein the snap-in section comprises a second snap-in portion, the housing comprises at least one housing protrusion edge formed on a housing lateral surface of the housing, and the second snap-in portion and the housing protrusion edge together form a snap-fit joint,
   wherein the second snap-in portion and the extending section are located on different planes.

2. The image capturing device as claimed in claim 1, wherein the extending section comprises at least one first bending portion connected to the base, and the first bending portion provides elastic force.

3. The image capturing device as claimed in claim 2, wherein the first bending portion is a curved portion protruding away from the snap-in section.

4. The image capturing device as claimed in claim 2, wherein the extending section comprises a first extending arm and a second extending arm parallel to the first extending arm, and the first extending arm and the second extending arm are connected to the first bending portions.

5. The image capturing device as claimed in claim 2, wherein the extending section is a Y-shaped member, the extending section comprises a first extending arm and a second extending arm, an end of the first extending arm is joined with an end of the second extending arm, and the first extending arm and the second extending arm are connected to the first bending portions.

6. The image capturing device as claimed in claim 1, wherein the lever further comprises at least one first rib, and the first rib is formed where the extending section joins the snap-in section.

7. The image capturing device as claimed in claim 1, wherein the clip member further comprises a plurality of protrusions, and the protrusions abut the housing abutting surface.

8. The image capturing device as claimed in claim 1, wherein the clip member further comprises a plurality of second ribs, and the second ribs are formed on the lateral sides of the base.

9. The image capturing device as claimed in claim 1, wherein the base comprises a hole, and the tube passes through the hole.

10. The image capturing device as claimed in claim 1, wherein the lever comprises a first lever and a second lever, and the first lever faces the second lever.

11. The image capturing device as claimed in claim 1, wherein the cover comprises a cover body, an elastic seal, and a plurality of elastic abutting members, the elastic seal surrounds the cover body, the elastic abutting member protrudes from the cover body, the image capturing module further comprises a second substrate and a spacer, the spacer is disposed between the first substrate and the second substrate, and the elastic abutting member abuts the second substrate.

12. The image capturing device as claimed in claim 11, wherein the elastic seal and the elastic abutting member are integrally formed.

\* \* \* \* \*